United States Patent
Aslanidis et al.

(10) Patent No.: US 11,126,575 B1
(45) Date of Patent: Sep. 21, 2021

(54) INTERRUPT RECOVERY MANAGEMENT

(71) Applicant: Amazon Technologies, Inc., Seattle, WA (US)

(72) Inventors: Ioannis Aslanidis, Dresden (DE); Filippo Sironi, Dresden (DE); Karimallah Ahmed Mohammed Raslan, Dresden (DE); Jan Hendrik Schönherr, Dresden (DE)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/293,525

(22) Filed: Mar. 5, 2019

(51) Int. Cl.
*G06F 13/24* (2006.01)
*G06F 9/455* (2018.01)

(52) U.S. Cl.
CPC .......... *G06F 13/24* (2013.01); *G06F 9/45558* (2013.01); *G06F 2009/45579* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 5,564,060 A | 10/1996 | Mahalingaiah et al. | |
| 6,115,779 A | 9/2000 | Haubursin et al. | |
| 7,000,051 B2 | 2/2006 | Armstrong et al. | |
| 8,689,333 B2* | 4/2014 | Aziz | H04L 63/1491 726/24 |
| 9,405,666 B2* | 8/2016 | Kruglick | G06F 11/36 |
| 2004/0215749 A1* | 10/2004 | Tsao | H04L 41/12 709/220 |
| 2005/0102567 A1* | 5/2005 | McGuire | G06F 11/2257 714/25 |
| 2005/0183093 A1 | 8/2005 | Pope et al. | |
| 2006/0010450 A1* | 1/2006 | Culter | G06F 9/5077 718/104 |
| 2006/0020940 A1* | 1/2006 | Culter | G06F 9/5077 718/100 |
| 2006/0184480 A1* | 8/2006 | Ayyar | G06F 9/50 706/45 |
| 2008/0126648 A1 | 5/2008 | Brownlow et al. | |
| 2008/0294808 A1* | 11/2008 | Mahalingam | G06F 9/45558 710/26 |

(Continued)

OTHER PUBLICATIONS

"9.2 Handling Interrups—Chapter 9 Advance Issues", Retrieved from URL: http://www.jungo.com/st/support/documentation/windriver/10.2.0/wdpci_manual.mhtml/Handling_interrupts.html on Jan. 10, 2019, pp. 1-15.

(Continued)

*Primary Examiner* — Henry Tsai
*Assistant Examiner* — Christopher A Bartels
(74) *Attorney, Agent, or Firm* — Robert C. Kowert; Kowert, Hood, Munyon, Rankin & Goetzel, P.C.

(57) ABSTRACT

An interrupt recovery manager detects that a compute instance has exited a state in which interrupts from one or more interrupt sources were not processed at the compute instance. The recovery manager identifies a source from which interrupts may have been missed by the compute instance, and causes an indication of a potential missed interrupt from that source to be delivered to the compute instance.

22 Claims, 9 Drawing Sheets

(56) References Cited

U.S. PATENT DOCUMENTS

| | | | | |
|---|---|---|---|---|
| 2008/0294825 | A1* | 11/2008 | Mahalingam | G06F 9/4812 710/262 |
| 2009/0249049 | A1* | 10/2009 | Weissman | G06F 11/3414 712/238 |
| 2011/0153893 | A1* | 6/2011 | Foong | G06F 9/4812 710/268 |
| 2013/0346371 | A1* | 12/2013 | Beck | G06F 3/0619 707/675 |
| 2014/0269881 | A1* | 9/2014 | He | H04L 25/03878 375/231 |
| 2014/0281641 | A1* | 9/2014 | Herrera Mejia | G06F 1/24 713/330 |
| 2014/0281753 | A1* | 9/2014 | Wagh | G06F 13/4295 714/56 |
| 2015/0089259 | A1* | 3/2015 | Warren | G06F 1/325 713/322 |
| 2015/0169036 | A1* | 6/2015 | Sodhi | G06F 1/3243 713/320 |
| 2015/0185809 | A1* | 7/2015 | Bharadwaj | G06F 1/3253 713/323 |
| 2016/0078342 | A1* | 3/2016 | Tang | H04L 41/00 706/47 |
| 2016/0217090 | A1* | 7/2016 | Sengoku | G06F 13/26 |
| 2017/0177346 | A1* | 6/2017 | Gokhale | G06F 9/345 |
| 2017/0177349 | A1* | 6/2017 | Yount | G06F 15/8007 |
| 2017/0177360 | A1* | 6/2017 | Gokhale | G06F 12/0862 |
| 2019/0174449 | A1* | 6/2019 | Shan | H04W 60/00 |

OTHER PUBLICATIONS

"Chapter 7 Interrupts and Interrupt Handlers—Shichao's Notes", Retrieved from URL: https://notes.shichao.io/lkd/ch7/ on Jan. 5, 2019, pp. 1-26.

"Introduction to Message-Signaled Interrupts" Retrieved from URL https://docs.microsoft.com/en-us/windows-hardware/drivers/kernel/introduction-to-message-signaled-interrupts on Jan. 10, 2019, pp. 1-2.

"irqbalance(1)—Linus man page", retrieved from URL https://linux.die.net/man/1/irqbalance on Jan. 11, 2019, pp. 1-3.

PCI Express, "PCI Express Base Specification Revision 3.0", Nov. 10, 2010, pp. 1-17.

* cited by examiner

INTERRUPT RECOVERY MANAGEMENT

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers.

Some public data center operators provide network access, power, and secure installation facilities for hardware owned by various customers, while other public data center operators provide "full service" facilities that also include hardware resources made available for use by their customers.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine. Similarly, a single physical storage device may be used to store data objects/items of several different customers, e.g., in respective virtualized storage containers.

Figure 1:
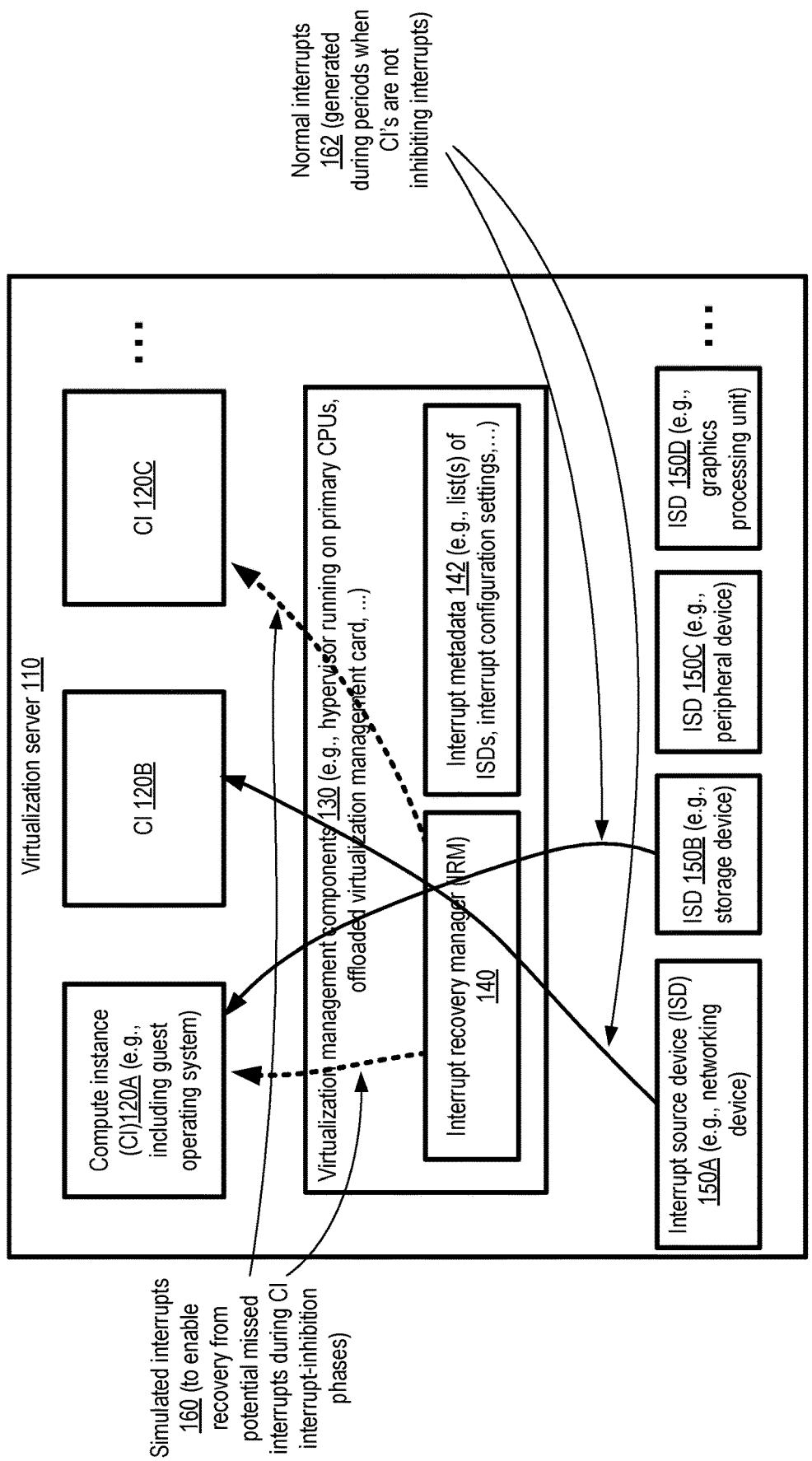
FIG. 1 illustrates an example system environment in which an interrupt recovery manager within a virtualization management component at a host may enable compute instances to handle interrupts that may have otherwise been ignored during periods of interrupt inhibition, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and apparatus for enabling compute instances such as guest virtual machines running on virtualization hosts to recover from potentially missed interrupts. In some virtualization scenarios, multiple compute instances with respective processing requirements may be run on a single host on behalf of one or more clients of a virtualized computing service. Under most operating conditions, a given compute instance at a host may respond to interrupts raised by any of several different types of interrupt source devices (ISDs), such as networking devices, storage devices, graphical processing units (GPUs), peripheral devices and the like. Respective interrupt handlers may be configured within the operating system of the compute instance to respond to such interrupts. Operating systems of compute instances may be referred to as guest operating systems in various embodiments. In at least some embodiments, one or more of the devices may communicate with other components of the host using a peripheral interconnect, such as an interconnect compliant with a version of the PCI (Peripheral Component Interconnect) or PCIe (Peripheral Component Interconnect—Express) standard.

In some embodiments, for a number of reasons, a given compute instance may enter a state in which interrupts from one or more devices (e.g., networking devices, storage devices, peripheral devices etc.) may temporarily not be processed at the compute instance. As one example, during the operation of customer workloads running within compute instances on top of a hypervisor, the guest operating system may attempt to load balance the interrupt handling of devices spread across available central processing units (CPUs). When this happens, interrupts for those devices are temporarily disabled so that the migration from one CPU to another can occur. Periods during which interrupts are not processed may be termed "interrupt inhibition", "interrupt masking" or "interrupt suppression" periods in various embodiments. Even though interrupt sources, such as PCI devices, may be notified that interrupts are not to be raised during such periods, interrupts may sometimes nevertheless be raised by some devices, e.g., due to race conditions or lack of full compliance with standard specifications. Live software updates and/or migrations of compute instances from one host to another may represent other example scenarios involving interrupt inhibition periods in various embodiments.

Any of a number of techniques, such as setting one or more mask bits in an interrupt configuration data structure, may be used in different embodiments (e.g., by guest operating systems) to signal to interrupt source devices that interrupts are not going to be handled. It may, however, be the case, due to race conditions or the like as mentioned above, that one or more of the interrupt sources may attempt to raise an interrupt during an interrupt inhibition period. Because interrupts are inhibited, however, such an interrupt may not actually be delivered to or processed at the guest operating system, and as a result the work that would normally be done to respond to the interrupt may not be performed, even though the interrupt source may be expecting one or more actions to be performed in response to the interrupt. Such an undelivered interrupt may also be referred to as a missed interrupt in at least some embodiments. Depending on the nature of the interrupt and the interrupt source, and the type of operations that would typically be performed to handle such an interrupt, a number of undesirable side effects of missed interrupts may occur in some embodiments—for example, an interrupt source device may reset itself or enter an error state, the compute instance may hang or crash, application data that would otherwise be delivered to the compute instance may be lost, and so on. Note that in various embodiments the compute instance may continue to perform at least some operations during interrupt inhibition periods—that is, the compute instance may not be quiesced or swapped out while interrupts are inhibited.

In order to mitigate or avoid such problems, an interrupt recovery manager (IRM) may be implemented in various embodiments. Such an IRM may, for example, be incorporated within a virtualization management component such as a hypervisor. In at least some embodiments, the IRM may be able to detect when a given compute instance enters or exits an interrupt inhibition state, and may also have access to other interrupt-related metadata such as a list of interrupt source devices of the compute instance, configuration settings for interrupts from various interrupt source devices and the like.

According to one embodiment, in response to detecting that a compute instance has exited an interrupt inhibition phase or state, the IRM may identify one or more interrupt source devices, such that respective indications of potential missed interrupts from the interrupt source devices are to be provided to the compute instance. In some embodiments, all the interrupt source devices capable of generating interrupts directed to the compute instance may be included in the set of devices for which respective indications of potential missed interrupts are to be provided, while in other embodiments only a subset of the configured interrupt source devices may be included in the set. In at least some embodiments, the IRM may not necessarily be responsible for, or necessarily capable of, detecting actual occurrences of missed interrupts with respect to at least some interrupt source devices. As a result, in such embodiments, it may not be possible for the IRM (or any other component of the server) to store a record of an interrupt miss.

The IRM may cause an indication of a respective potential missed interrupt from individual ones of one or more such interrupt sources to be provided to the compute instance. In some embodiments, for example, the IRM may raise a respective simulated interrupt corresponding to each selected interrupt source, thus mimicking the raising of an actual interrupt. Such simulated interrupts, which serve as indications of potential missed interrupts, may be referred to in some embodiments as "spurious," "fake," or "unsolicited" interrupts. Note that as mentioned above, in various embodiments, the IRM may simulate an interrupt corresponding to a particular interrupt source without having any record or evidence that that source did in fact generate an interrupt; no such record or evidence may have been created in such embodiments, so the work done by the IRM to generate a simulated or fake interrupt may represent a conservative procedure undertaken despite the lack of any specific evidence that such work is actually required. As also mentioned earlier, the compute instance may continue to run while interrupts are inhibited—e.g., computations that are not interrupt-related may continue to be performed.

When the compute instance obtains such an indication of a potential missed interrupt, the compute instance may check whether the corresponding interrupt source device is actually waiting for an action corresponding to a (missed) interrupt. Note that this type of checking may be performed as part of normal interrupt handling by the compute instance in at least some embodiments; determining whether a device is still waiting for a response to an interrupt may represent a small amount of processing, performed to handle actual interrupts as well as in response to fake interrupts in such embodiments. In at least some embodiments, the initial part of a response to a fake interrupt by a compute instance may thus be no different than the initial part of a response to an actual interrupt. If the compute instance discovers that the interrupt source device did in fact raise an interrupt that was missed, or is waiting for a response to an interrupt, the compute instance may perform one or more operations to respond to the missed interrupt in various embodiments—e.g., using the interrupt handler that is configured for a category of interrupts to which the missed interrupt belongs. As a result of such deferred processing of the missed interrupt, the probability of problematic scenarios mentioned above, such as device resets, loss of application data, hung or crashed compute instances and the like may be lowered in various embodiments. In some embodiments, other mechanisms may be used to deliver indications of potential missed interrupts—e.g., instead of raining a simulated interrupt, a message to check for interrupts from one or more sources may be directed to an interrupt recovery agent in the operating system of the compute instance, and so on.

In at least some embodiments, if the IRM provides indications of N potential missed interrupts (corresponding to N different interrupt source devices) to a compute instance after the compute instance exits an interrupt inhibition state, this does not necessarily mean that N interrupts were missed during the interrupt inhibition period—it may be the case that no interrupts were actually missed, or a number of interrupts smaller than N were missed by the compute instance. The IRM may not have access to data indicating that any interrupts from the ISDs actually occurred (or were initiated) in an interrupt inhibition period in at least some embodiments. If the compute instance discovers that, despite the indication of a potential missed interrupt PMI1 from a particular device D1, an actual interrupt was not raised by D1, the compute instance may simply perform the equivalent of a "no-op" with respect to PMI1 in some embodiments—that is, no additional interrupt-related processing may be performed with respect to D1, at least until a subsequent interrupt is actually raised by D1, or until another interrupt inhibition period is entered and exited. The overhead associated with responding to the indication of the potential missed interrupt may be low in various embodiments. The provision of the indications of missed interrupts may thus be considered a precautionary endeavor in various embodiments, intended to reduce (with a low overhead) compute instance instability and undesired events of the kind discussed above. In one embodiment, the total number of interrupt source devices may be low enough, and/or the per-device overhead of checking whether an interrupt was actually missed may be low enough, that indications of potentially missed interrupts may be generated for all the configured interrupt source devices.

As mentioned above, in some embodiments, an interrupt recovery manager may be implemented as part of a virtualization management component such as a hypervisor. In one embodiment, the functionality of a hypervisor may be distributed between a portion that runs on the primary processors (CPUs) of a host, and a portion that runs at one or more offload cards (e.g., PCI or PCIe cards at which networking-related virtualization management tasks are offloaded from the primary processors, storage-related virtualization management tasks and the like are offloaded from the primary processors, and so on). In such embodiments, portions or all of an IRM may comprise a thread of execution running on a CPU, and/or a thread of execution running at an offload card.

The contributing factors that may result in interrupt inhibition at an operating system of a compute instance, and the durations of such interrupt inhibition periods, may vary in different embodiments. In some embodiments, for example, a guest operating system may attempt to balance the workload associated with interrupt handling among the available physical processors of the host, e.g., by issuing the logical equivalent of an "irqbalance" Linux request. As a result, the processing workload associated one or more interrupt handlers may be moved from one physical processor to another, and interrupts from the corresponding source devices may consequently be inhibited briefly. In at least one embodiment, an irqbalance daemon process within the guest operating system may, by default, automatically attempt to balance the workload associated with interrupt handling across the physical processors. In such an embodiment, commands such as "systemctl status irqbalance" (to check the status of the daemon), "systemctl stop irqbalance" (to stop the daemon if it is running) and/or "systemctl disable irqbalance" (to prevent the daemon from being restarted after reboot) may be supported, and in some cases a configuration file such as "/etc/sysconfig/irqbalance" may be used to exclude specified CPUs from the interrupt handler load balancing operations if desired. In another example scenario, interrupts from one or more sources may be temporarily inhibited during live updates of the software/firmware being used at the compute instance. In some embodiments, interrupts may temporarily be inhibited during one or more stages of a procedure implemented to migrate of compute instances from one physical host to another.

Depending on the operating system version being used for a compute instance, any of a number of interrupt processing techniques may be used. In some embodiments, for example, message signaled interrupts (MSI) or MSI-X (message signaled interrupts—extended) defined in PCI or PCIe standards may be employed for at least some interrupt source devices. In one such embodiment, a guest operating system may store, in a data structure visible to an interrupt source device and to the IRM, an indication of a respective memory address and a value to be stored at that address to raise a particular type of interrupt. The IRM may use such interrupt configuration information to simulate interrupts in various embodiments—e.g., the IRM may store the expected value in the expected memory address to indicate the potentially missed interrupt.

In at least some embodiments, such interrupt recovery techniques may be implemented at a network-accessible service, such as a virtualized computing service (VCS) of a provider network, whose resources may be acquired by clients to implement various kinds of applications. Networks set up by an entity such as a company or a public sector organization to provide one or more network-accessible services (such as various types of cloud-based computing, storage or analytics services) accessible via the Internet and/or other networks to a distributed set of clients may be termed provider networks in one or more embodiments. A provider network may sometimes be referred to as a "public cloud" environment. The resources of a provider network may in some cases be distributed across multiple data centers, which in turn may be distributed among numerous geographical regions (e.g., with each region corresponding to one or more cities, states or countries). In other embodiments such techniques may be employed at standalone hosts that are not necessarily part of a network-accessible service. In at least some embodiments, clients on whose behalf compute instances are set up at virtualization servers may indicate, via one or more programmatic interactions, whether they wish to have interrupt recovery techniques similar to those introduced above performed for some or all of their compute instances, and/or to indicate the types of interrupt sources for which interrupt recovery should or should not be performed. In one embodiments, metrics associated with interrupt recovery, such as the number of missed interrupts for which responsive actions were performed as a result of the operations of an interrupt recovery manager, and/or the interrupt sources whose interrupts were missed, may be collected. Such metrics may be useful, for example, in determining whether attempts should be made to further shorten the time periods during which interrupts are inhibited/disabled at various compute instances, or whether changes should be made in the manner in which interrupt source devices are used by one or more types of applications.

As one skilled in the art will appreciate in light of this disclosure, certain embodiments may be capable of achieving various advantages, including some or all of the following: (a) enhancing the stability and robustness of computing systems, by preventing or reducing crashes, hung systems, and the like that could be caused by missed interrupts, (b) improving the performance of some types of applications, e.g., by avoiding additional computations that may be required when application data is lost as a result of missed interrupts, (c) reducing the debugging resources that may be required to respond to errors or customer complaints at a computing service, e.g., especially for hard-to-analyze and hard-to-reproduce situations such as race conditions between interrupt masking attempts and subsequent attempted interrupts, and/or (c) improving the resource utilization levels at provider network services such as a virtualized computing service, by making workload migration (which may involve periods of interrupt inhibition) more reliable and therefore more likely to be utilized.

Example System Environment

FIG. 1 illustrates an example system environment in which an interrupt recovery manager within a virtualization management component at a host may enable compute instances to handle interrupts that may have otherwise been ignored during periods of interrupt inhibition, according to at least some embodiments. As shown, system 100 comprises a virtualization server 110 at which one or more compute instances 120 (e.g., 120A, 120B or 120C) may be run, e.g., on behalf of one or more clients of a virtualized computing service. A compute instance may, for example, comprise a guest virtual machine in some embodiments, which in turn includes a guest operating system and one or more application programs that run on top of the guest operating system. One or more virtualization management components 130, such as a hypervisor comprising one or more threads of execution running on the primary physical processors of the server 110, and/or or more offloaded virtualization management cards (described below in further detail) may act as intermediaries between the compute instances 120 and at least some of the hardware components of the virtualization server 110 in the depicted embodiment. Note that the extent to which hardware devices are virtualized (as opposed to being managed directly from the guest operating system), and therefore the amount of work that is done by the virtualization management components 130, may vary for different kinds of compute instances 120. In one embodiment, a "bare-metal" compute instance may be established on behalf of a client at a server 110, and such a bare-metal instance may comprise various processes of an operating system that directly control at least a portion of the hardware of the server, without utilizing virtualization (although a small subset of the hardware functionality may be virtualized in some cases). Further, the performance capacities and lifetimes of different compute instances 120 may vary substantially in at least some embodiments—some compute instances may be expected to run for months or years, and may perform compute-intensive tasks with the help of large amounts of memory, while others may be referred to as "micro" virtual machines, which are short lived and only require relatively small amounts of memory and compute resources. In at least some embodiments, various categories of compute instances may be supported, such as "large", "medium", "small" and "micro" compute instances, with respective levels of performance capacity along various dimensions such as processing, storage, memory and the like.

The virtualization server 110 may comprise a plurality of interrupt source devices 150 (e.g., ISDs 150A-150D), such as for example networking devices including one or more network interface cards or NICs, storage devices, peripheral devices such as mice, keyboards and the like, graphics processing units (GPUs) and the like. During normal operation, individual ones of the ISDs may raise interrupts, labeled normal interrupts 162 in FIG. 1, respectively directed to individual compute instances which have not inhibited or suppressed interrupts. Such normal interrupts may be processed at interrupt handlers of the guest operating systems (GOSs) of the compute instances. For example, a given interrupt handler may comprise a "top-half" and a "bottom half" in some embodiments. In the top half, urgent operations related to the interrupt may be performed (e.g., notifying the ISD that its interrupt has been received, modifying state information of the ISD, etc.), while in the bottom half less urgent tasks (such as processing contents of a data packet or message received from the ISD) may be performed asynchronously with respect to the top half. Interrupt handlers may in at least some embodiments include logic that is able to check whether a corresponding ISD did in fact raise an interrupt for which some action is to be undertaken, or whether no further action is required. Such checks to determine whether additional processing of an interrupt is needed (or whether the equivalent of a "no-op" is to be implemented, in which no more work is done) may be very efficient in such embodiments.

In various embodiments, for a number of reasons, a guest operating system of a given compute instance may temporarily enter a state in which interrupts from one or more ISDs 150 (or, in some cases, all ISDs), are not processed. As such, if an interrupt is actually initiated by such an ISD while the compute instance is in such a state, the interrupt may be missed (not handled as it would have normally been handled). Such interrupt inhibition states or periods may occur, for example during certain types of software updates, in scenarios in which the workload of one or more interrupt handlers is being transferred for load balancing or other reasons from one physical processor to another, during certain phases of compute instance migration, and so on in different embodiments. A virtualization management component 130 may comprise an interrupt recovery manager (IRM) in the depicted embodiment, that can detect when a given compute instance enters or exits such an interrupt inhibition state. For example, in order to inhibit interrupts, a guest operating system of a compute instance may submit a command to mask one or more bits of interrupt configuration data, and such a command may be processed with the help of (or intercepted by) the virtualization management component, thus enabling the IRM to detect the entry into an interrupt inhibition state in some embodiments. Similarly, in such embodiments, the IRM 140 may be able to detect when the bit or bits are eventually unmasked by a guest operating system, indicating an exit from the inhibited-interrupt state. In one embodiment, not all ISDs' interrupts may necessarily be inhibited during such inhibition intervals by a given compute instance. In other embodiments, other techniques may be used by the IRM to detect when a given compute instance has inhibited or enabled interrupts. The IRM 140 may also have access to interrupt related metadata 142 in various embodiments, e.g., including a list of ISDs 150 from which interrupts may be generated at individual ones of the compute instances, configuration settings such as the relative priorities of interrupts from different ISDs, metrics such as the numbers of actual and missed interrupts from a given ISD to a given compute instance, and so on.

In at least some embodiments, in response to detecting that a given compute instance 120 has exited a state in which interrupts from one or more ISDs were not being processed, the interrupt recovery manager 140 may identify one or more ISDs 150 for which respective indications of potential missed interrupts are to be provided to the compute instance 120. Interrupt metadata 142 may be used by the IRM to identify the ISDs 150 in the depicted embodiment. In some embodiments only a subset of the ISDs 150 of the virtualization server 110 may be identified as candidates for which indications of missed interrupts are to be provided, while in other embodiments signals of potential missed interrupts may be provided on behalf of all the ISDs 150. The IRM 140 may cause the respective indications of potential missed interrupts to be provided to the compute instance, corresponding to the one or more identified ISDs 150 in the depicted embodiment. For example, respective simulated or spurious interrupts 160 may be generated or raised by the IRM 140 in some embodiments using the interrupt configuration metadata accessible to the IRM 140. In effect, the IRM 140 may make it appear to the compute instance that one or more interrupts have in fact been raised by the one or more ISDs 150 in such embodiments. In other embodiments, instead of generating simulated or fake interrupts, other signaling or messaging mechanisms may be used to indicate the possibility of missed interrupts—e.g., an agent running within the guest operating system may be sent a request to check for potential interrupts from the one or more ISDs. In one embodiment, the IRM 140 may provide indications of potential missed interrupts from at least one ISD to a compute instance based on a triggering condition other than the exit of the compute instance from an interrupt inhibition state—e.g., such an indication may be provided if the IRM 140 detects a change to a configuration of an ISD, or such indications may be provided after a time interval has expired since the last time indications of potential missed periods were provided.

When the compute instance 120 obtains the indication 160 of a potential missed interrupt from a particular ISD 150, the compute instance 120 may check whether any work actually needs to be done on behalf of the particular ISD 150 in various embodiments. If some operations are required, e.g., in the scenario where the ISD 150 did attempt to raise an interrupt during the inhibition period and the interrupt was missed, the compute instance 120 may perform one or more operations responsive to the missed interrupt. If no interrupt was missed from the particular ISD 150, the compute instance 120 may be able to efficiently detect that further interrupt-related processing associated with the ISD 150 is not required (e.g., in the top half of an interrupt handler for a given type of interrupt from the ISD). In such a scenario, the compute instance may implement the equivalent of a "no-op" in the depicted embodiment, before moving on to processing any remaining indications of potential missed interrupts.

As a result of the operations of the IRM 140, a compute instance 120 may thus be able to respond appropriately, with very low overhead, to interrupts that were missed during the period when interrupts were inhibited in the depicted embodiment. Consequently, undesirable events such as crashes, hangs or application data loss that could have been caused directly or indirectly by the missed interrupts may be avoided, and the robustness and stability of the compute instance 120 and/or the virtualization server 110 may be significantly enhanced.

Example Timeline of Events Associated with an Undelivered Interrupt

Figure 2:
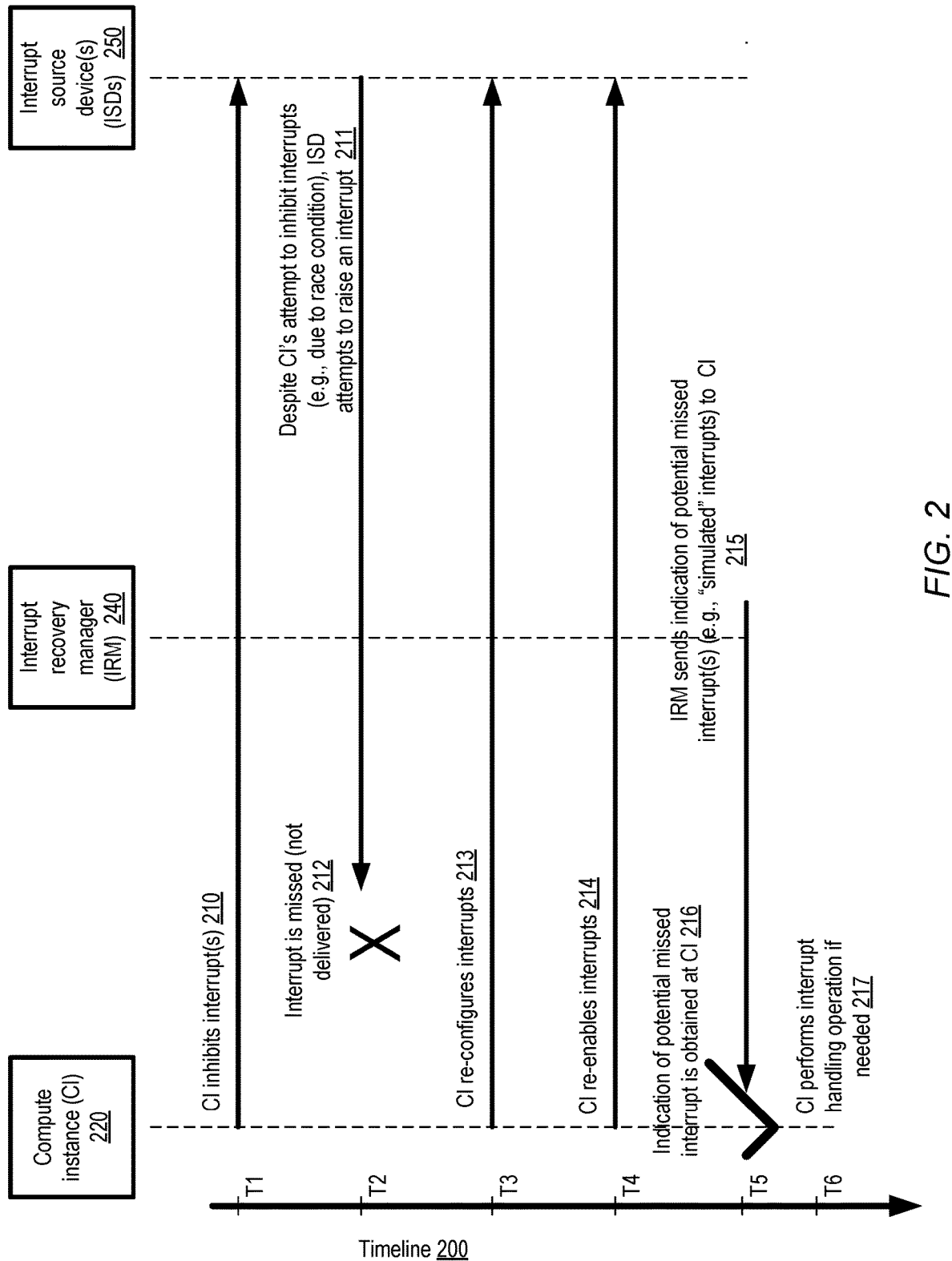
FIG. 2 illustrates a high-level view of an example sequence of events associated with undelivered interrupts at a host, according to at least some embodiments.

FIG. 2 illustrates a high-level view of an example sequence of events associated with undelivered interrupts at a host, according to at least some embodiments. Timeline 200 proceeds from the top of FIG. 2 towards the bottom, with earlier events closer to the top and later events closer to the bottom. At time T1, a guest operating system of a compute instance 220 (similar in features and functionality to compute instances 120 of FIG. 1), or some other component of the virtualization host, may inhibit one or more categories of interrupts from one or more interrupt source devices 250 in the depicted embodiment, as indicated by arrow 210. In some embodiments, such inhibition may be accomplished by setting one or more bits in a data structure accessible to the ISDs 250.

At some time T2 after T1, despite the CI's attempt to inhibit the interrupts, an ISD 250 may attempt to raise an interrupt directed to CI, as indicated by arrow 211. Such an attempt may be made as a result of a race condition in some embodiments—e.g., the ISD's attempt may occur (a) after an attempt to store a value or data structure such as a bit mask indicating that interrupts are inhibited is initiated, and (b) before such a value is read or accessed/detected by the interrupt source device. Because the compute instance has attempted to inhibit/disable the interrupt already at time T1, the interrupt may not be delivered to or processed by the CI 220, as indicated by the "X" symbol labeled 212. Note that at least in some embodiments, depending on the mechanisms used for raising interrupts (such as whether message signaled interrupts (MSIs) of the kind discussed below), an interrupt recovery manager 240 may not necessarily be able to detect or track actual misses of interrupts. In other embodiments, the IRM 240 may be able to detect missed interrupts, and may use such information to later send indications of the missed interrupts to the CI 220.

At a point in time T3, the compute instance 220 may re-configure interrupts, as indicated by arrow 213 in the depicted embodiment. The details of the configuration operations may vary based on the interrupt processing mechanisms used—e.g., in some embodiments, memory addresses at which specified values are to be written on behalf on or by an ISD may be stored within an interrupt configuration data structure. After the configuration operations are completed, the CI 220 may re-enable interrupts, as indicated by arrow 214. For example, one or more bits that were masked to disable the interrupts may be reset/unmasked in some embodiments.

The IRM 140 may detect the disabling and the re-enablement of interrupts by the CI 220 in the depicted embodiment. In response to detecting that the CI 220 is exiting the state in which interrupts were disabled/inhibited, the IRM may send respective indications of potential missed interrupts, corresponding to one or more ISDs 250, to the CI 220 in the depicted embodiment, as indicated by arrow 215 at time T5. Such indications may, for example, comprise respective spurious or simulated interrupts. The indication of a potential missed interrupt may be obtained at the CI 220 at or shortly after T5, as indicated by the check mark labeled 216 in the depicted embodiment. The CI 220 may then perform the appropriate interrupt handling operations if needed, e.g., at time T6, as indicated by label 217. Note that the inter-event time durations for at least some of the events shown in FIG. 2 may be very short in practice—e.g., the difference (T2–T1) may be a few microseconds or a few milliseconds in some cases. Event sequences with such short inter-event durations may make missed interrupts hard to debug, thus making the precautionary interrupt recovery techniques described above even more beneficial.

Example Scenarios in which Interrupts May be Missed

Figure 3:
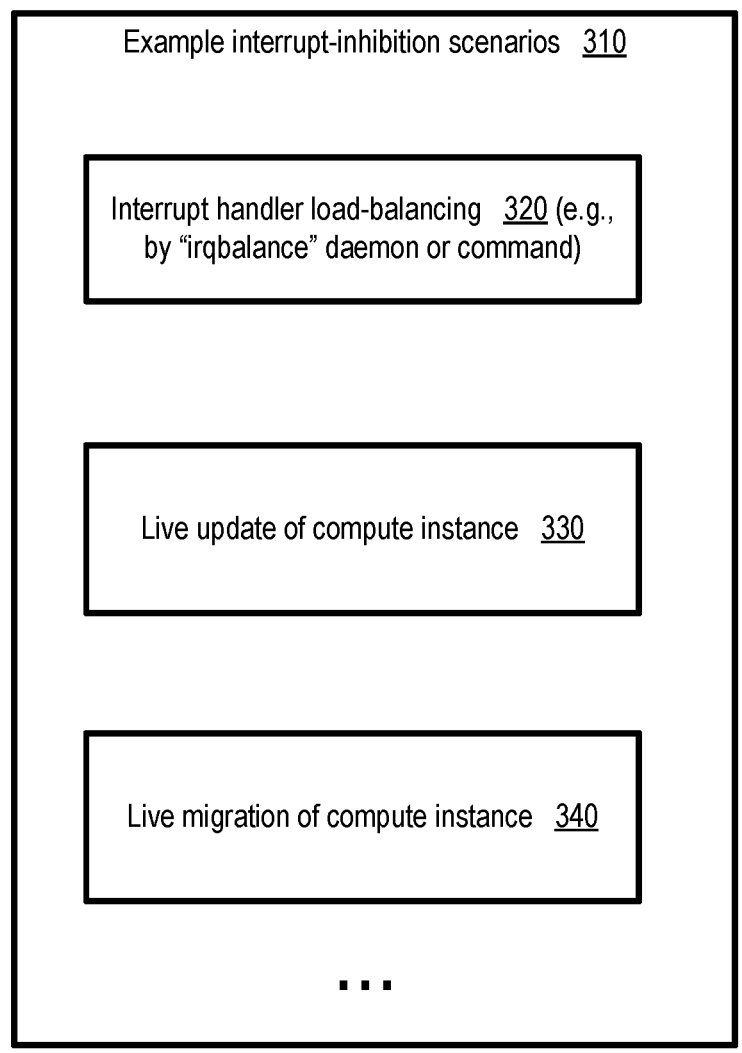
FIG. 3 illustrates example scenarios during which interrupts directed to a compute instance may be inhibited, according to at least some embodiments.

FIG. 3 illustrates example scenarios during which interrupts directed to a compute instance may be inhibited, according to at least some embodiments. As shown, example interrupt-inhibition scenarios 310 may include, among others, interrupt-handler load balancing 320, live updates 330 of compute instances and/or love migrations 340 of compute instances in various embodiments.

Some guest operating systems used for compute instances may support commands similar to the "irqbalance" command of various Linux-based operating systems. Such commands may be used, for example by a daemon or other operating system process, to migrate one or more interrupt handlers between physical processors (e.g., CPUs or cores) at a given server or host, in an attempt to balance the workload of the different processors, while the compute instance continues to run. During a time interval in which a given interrupt handler for an interrupt source device ISD-1 is being migrated, interrupts from ISD-1 may be inhibited or masked in at least some embodiments, and interrupts from ISD-1 may accordingly be missed during such time intervals in some embodiments.

During periods in which software and/or firmware at one or more layers of the stack being used at a compute instance (e.g., guest operating system layers, application layers, etc.) is being updated (as represented by element 330), interrupts from one or more ISDs may be inhibited in at least some embodiments. Update procedures during which the compute instance remains active/operational (at least for a significant portion of the update process) may be referred to as live updates in some embodiments, and such live updates may also provide potential windows for missed interrupts of the kind discussed above. Similarly, in some embodiments in which compute instances can be migrated "live" (as represented by element 340 of FIG. 3) from one virtualization server to another, there may be brief time intervals during which interrupts from one or more ISDs may be inhibited/masked in at least some embodiments, providing windows for missed interrupts.

In at least some embodiments, a virtualization management component at which an interrupt recovery manager of the kind introduced above is implemented may be able to detect when a given compute instance enters and/or exist states corresponding to interrupt handler load balancing 320, live updates 330, and/or live migrations 340. In some cases, the virtualization management component may initiate (or at least participate in the coordination of) procedures or tasks such as migrations and live updates. Note that at least in some embodiments, compute instances may inhibit interrupts for reasons other than those shown by way of example in FIG. 3.

Example Offloaded Virtualization Manager with Interrupt Recovery Support

Figure 4:
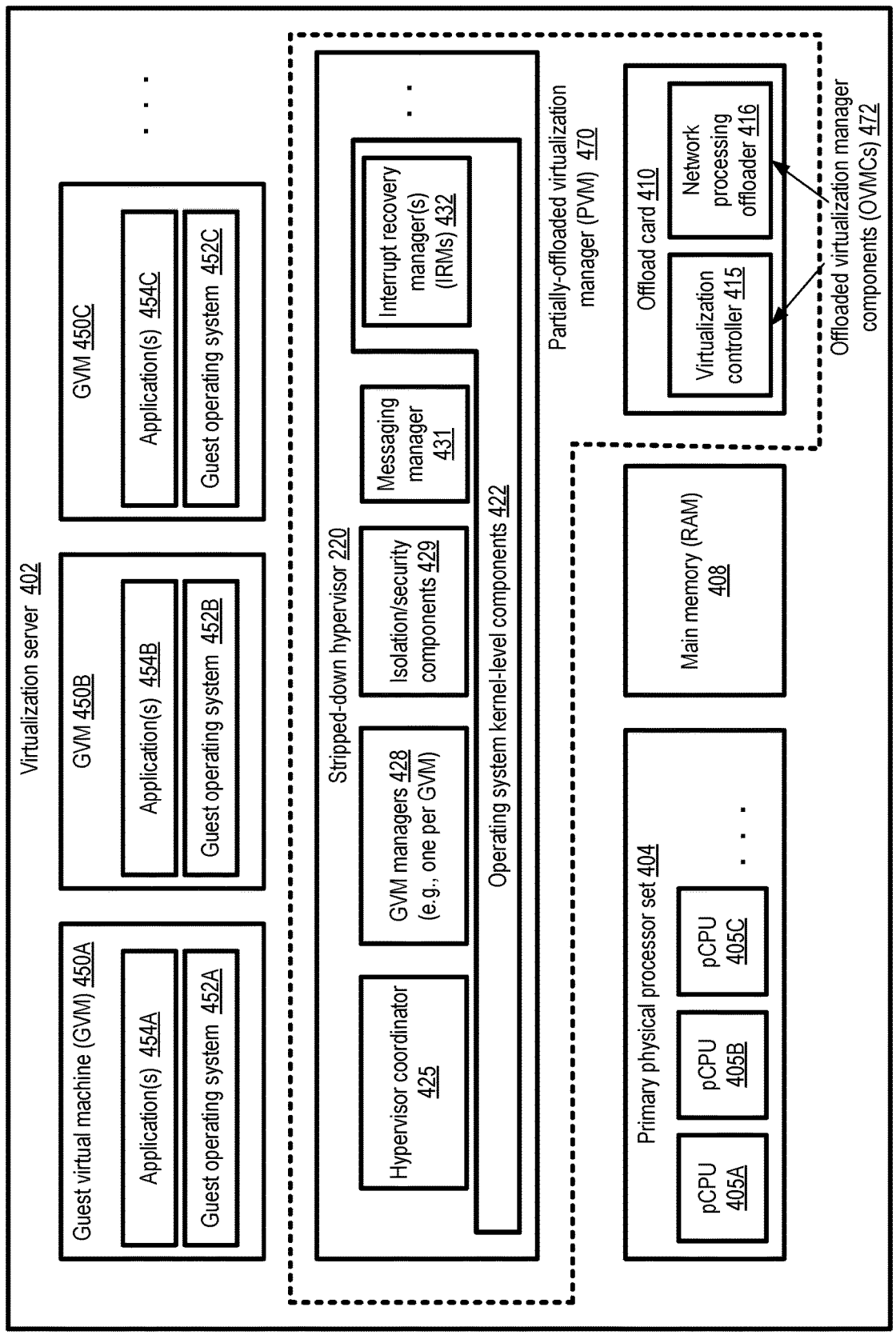
FIG. 4 illustrates an example virtualization server at which a partially-offloaded virtualization manager which includes one or more interrupt recovery managers may be implemented, according to at least some embodiments.

FIG. 4 illustrates an example virtualization server at which a partially-offloaded virtualization manager which includes one or more interrupt recovery managers may be implemented, according to at least some embodiments. As shown, a virtualization server 402, similar in functionality and features to virtualization server 110 of FIG. 1, may comprise a primary physical processor set 404, a main memory (e.g., one or more modules of random access memory or RAM) 408, a partially-offloaded virtualization manager (PVM) 470 and zero or more guest virtual machines GVMs 450, such as GVMs 450A-450C. (Virtualization server 202 may also comprise a number of other components, e.g., various persistent storage devices, which are not shown in FIG. 4 to avoid clutter.) The primary physical processor set 404 may comprise a number of physical CPUs (pCPUs), including pCPUs 405A-405C in the depicted embodiment. The virtualization manager 470 may be referred to as being "partially offloaded" in the depicted embodiment because at least a portion of the processing or computations required for virtualization management may be undertaken at a peripheral card (offload card 410), thereby making more of the computational capacity of the physical processors available for guest virtual machines. Virtualized versions of the pCPUs, called vCPUs or virtual CPUs, may be allocated to individual GVMs by the PVM 470 during the lifetime of the GVMs. Each GVM 450 may comprise a respective instance of an operation system (e.g., guest operating systems 452A-452C) and a set of applications (e.g., 454A-454C) being run, for example, on behalf of clients of a virtualized computing service (VCS) of a provider network. As mentioned earlier, GVMs 450 may represent examples of compute instances in various embodiments.

The PVM 470 may comprise an opportunistic stripped-down hypervisor 420 (which uses the pCPUs) and one or more offloaded virtualization manager components (OVMCs) 472 which do not use the pCPUs in the depicted embodiment. The hypervisor may be described as being opportunistic in that the hypervisor utilizes a physical CPU of the host primarily when given the opportunity to do so as a result of a voluntary relinquishment of the physical CPU by a guest virtual machine (e.g., when the guest virtual machine needs to perform an input/output operation, read a timer value, or perform some other operation which cannot be completed by the guest virtual machine on its own). By default, some or all of the subcomponent processes of the hypervisor may remain quiescent or in an idle state (i.e., not consuming CPU cycles). Under most operating conditions, one or more of the subcomponents may transition from the quiescent state to an active state only when a guest virtual machine relinquishes a physical CPU. A queue or similar logical data structure comprising outstanding virtualization management tasks for the hypervisor to perform may be maintained in some such embodiments, with task entries being added to the queue at the request of the offloaded virtualization manager components (which in turn may have received requests for some of the tasks from control plane components of a virtualized computing service in some cases). When the opportunistic hypervisor is able to utilize a physical CPU, it may obtain an outstanding task from the queue, perform the corresponding operations, and then relinquish the physical CPU to enable the guest virtual machine to resume its processing. Thus, for example, when a guest operating system 452 of a particular GVM 450 issues an I/O request (where the I/O is expected to take approximately time T1 to complete) and gives up a pCPU until a response to the I/O request is received, the hypervisor may make use of this opportunity to use the pCPU to perform one or more virtualization management tasks (which may typically take time T2, where T2<<T1) while the GVM is not expecting to use the pCPU. As such, the hypervisor 420 may have a minimal impact on the performance of applications 454 in the depicted embodiment. Hypervisor 420 may be described as being stripped-down in the depicted embodiment because some of the work performed by at least some conventional hypervisors may be handled by the OVMCs 472 instead, thereby reducing the complexity and size of the hypervisor 420.

Opportunistic virtualization management components (OVMCs) 472 may include, for example, a virtualization controller 415 and a network processing offloader 416 in some embodiments. Individual ones of the OVMCs may be implemented using a respective system-on-chip design in some embodiments. Although both OVMCs 472 are shown as being incorporated within a single offload card 410 (e.g., a PCIe card) in the depicted embodiment, other approaches regarding the arrangement and organization of the OVMCs may be employed in different embodiments. For example, in one embodiment, a single system-on-chip implementation may be used to perform the functions of the virtualization controller and the network processing offloader, thereby eliminating the need for two different OVMCs. In another embodiment, respective offload cards may be used for the virtualization controller 415 and the network processing offloader 416. The virtualization controller, as suggested by its name, may be responsible for organizing or orchestrating much of the virtualization management work performed at the server 402 in the depicted embodiment—e.g., it may be the first of the components of the PVM to boot, it may trigger the launches of the other components of the PVM, it may communicate with a VCS control plane, it make memory allocation decisions with respect to guest virtual machines, and so on. The network processing offloader 416 may be responsible for implementing one or more networking protocols (including for example an encapsulation protocol used within a VCS) and acting as an intermediary between the GVMs and networking endpoints outside the virtualization server in the depicted embodiment.

The hypervisor 420 may itself comprise a number of subcomponents in the depicted embodiment, including a set of operating system kernel-level components 422, a hypervisor coordinator 425, one or more GVM managers 428, isolation/security components 429, and/or a messaging manager 431. In at least some embodiments, one or more interrupt recovery managers 432 (similar in functionality and features to interrupt recovery manager 140 of FIG. 1) may represent examples of the operating system kernel-level components 422. The hypervisor coordinator 425, individual ones of the GVM managers 428, the isolation/security components 429 and/or the messaging manager 431 may be implemented as respective user-mode processes in at least some embodiments. In various embodiments, at least some of these components may be implemented as instances of respective statically linked programs, communicating with one another via pipes using simple, specialized protocols. The subcomponents of the hypervisor may remain passive or quiesced by default in the depicted embodiment, reacting and activating only in response to events (such as messages from other subcomponents, context switches initiated by GVMs, etc.). In some implementations, for example, several of the hypervisor subcomponents may typically remain blocked on a polling system call (such as epoll( ) or the equivalent) most of the time.

The kernel-level components 422 may provide support for various low-level operations such as the initial responses to VM exit instructions issued by the GVMs (e.g., when a GVM gives up a pCPU), interrupt-related tasks, and the like. As discussed earlier, in various embodiments an interrupt recovery manager 432 may detect when a guest operating system 452 inhibits and/or re-enables previously inhibited interrupts. The interrupt recovery manager may transmit indications of potential missed interrupts (such as simulated/fake interrupts) to the guest operating system after the guest operating system exits a state in which interrupts from one or more interrupt sources (including for example a network processing offloader 416, storage device interface cards and the like) were not processed, enabling the guest operating system to check whether any interrupt-related processing should be performed with respect to the sources, and to perform such processing if needed. The hypervisor coordinator 425, as implied by the name, may be responsible for orchestrating operations of the other subcomponents. The hypervisor coordinator 425 may, for example, implement an API which can be used for communications between the OVMCs 472 and the hypervisor, initiate GVM launches and terminations (e.g., at the request of an OVMC), expose metrics collected by the GVM managers, provide debugging capabilities, and so on. Each GVM manager 428 may be responsible for launching or instantiating a respective GVM based on a specification provided by the coordinator 425, monitoring metrics and logs of the GVM, and so on. In some embodiments there may be a 1-to-1 mapping between GVM managers and GVMs, while in other embodiments a single GVM manager may be responsible for multiple GVMs.

The messaging manager 431 may act as an intermediary between the virtualization controller 415 and the hypervisor, e.g., by translating commands issued using a queue-based protocol by the virtualization controller into pipe messages within the hypervisor. The security and isolation components 429 may be responsible, for example, for scrubbing or cleaning up GVM memory when a GVM terminates, so that inadvertent sharing of data across GVMs can be avoided. It is noted that the PVM may comprise additional components (not shown in FIG. 4) in at least some embodiments, while in at least one embodiment one or more of the PVM components shown in FIG. 4 may not be required. In some embodiments, multiple interrupt recovery managers 432 may run at a virtualization server 402, e.g., one IRM per guest virtual machine currently instantiated; in other embodiments, only a single interrupt recovery manager, capable of causing indications of potential missed interrupts to be provided to multiple GVMs, may be used. In at least one embodiment, an interrupt recovery manager 432 may be run at an offload card 410, e.g., as part of a network processing offloader 415. In some embodiments, a respective interrupt recovery manager may be run within a guest operating system 452—e.g., an IRM component of the guest operating system may cause indications of potential missed interrupts to be delivered to other interrupt handling components of the guest operating system. In at least one embodiment, a combination of IRMs running within respective types of components of a virtualization server may be used, e.g. some combination of zero or more IRMs running within a stripped-down hypervisor, zero or more IRMs running at respective offload cards or other hardware components, and zero or more IRMs running within respective guest operating systems may be employed.

Example Data Structures Used for Interrupt Configuration

Figure 5:
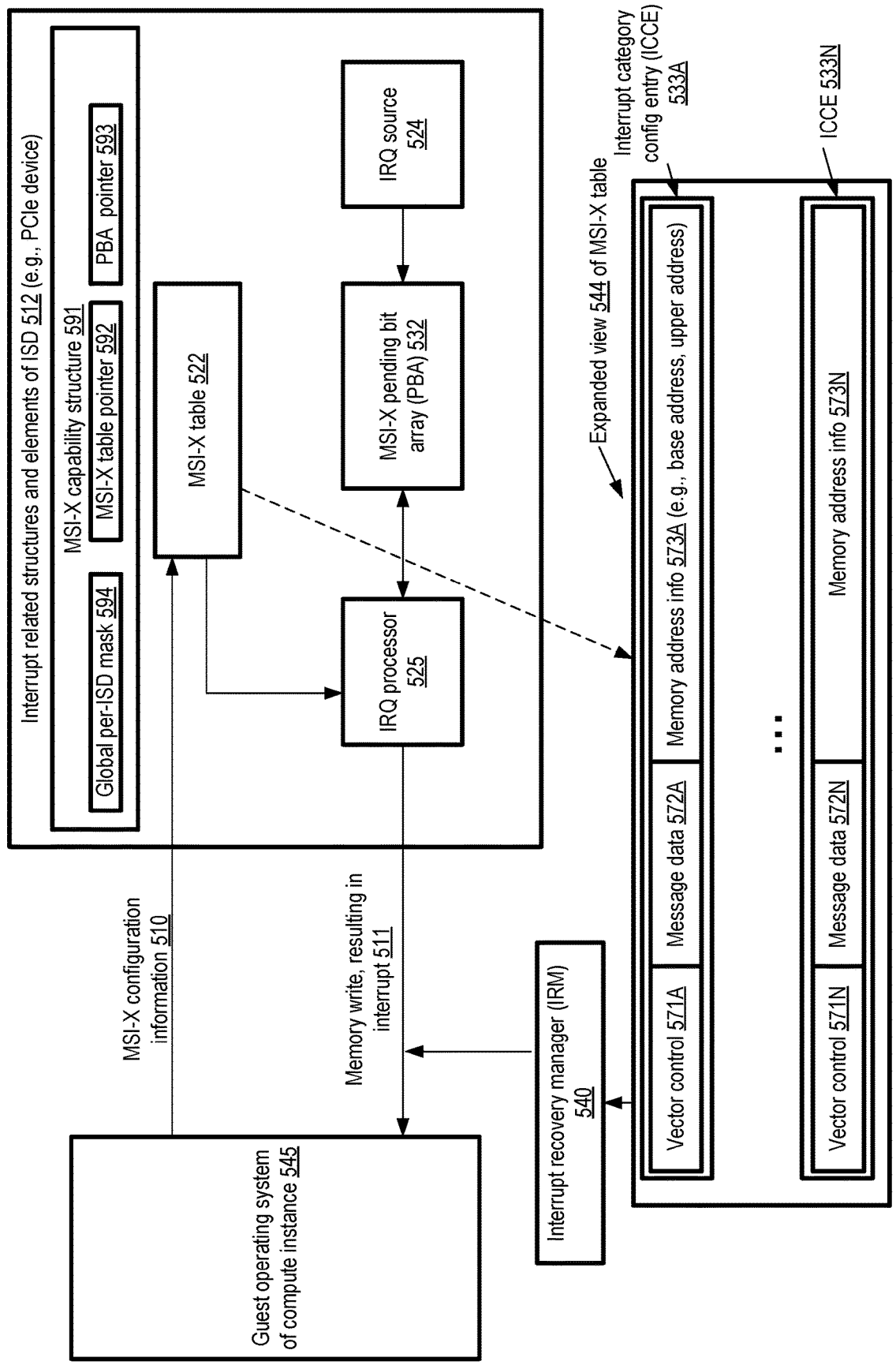
FIG. 5 illustrates example data structures associated with interrupt configuration, according to at least some embodiments.

FIG. 5 illustrates example data structures associated with interrupt configuration, according to at least some embodiments. In the depicted embodiment, an approach called message signaled interrupts (MSI, or MSI-X (MSI-extended)) may be employed for interrupt processing with respect to at least some interrupt source devices (e.g., devices attached using PCIe) of a virtualization host. A set of interrupt related data structures and elements of an interrupt source device 512 (e.g., a PCIe device) are shown in FIG. 5, including an MSI-X capability structure 591, an MSI-X table 522 and an MSI-X pending bit array (PBA) 532. Such data structures may be stored within the memory of an ISD in some embodiments, may be used collectively for interrupt configuration, and may be accessed during interrupt recovery operations. Note that other components of an ISD, such as buffers, networking components, storage components and the like are not shown in FIG. 5.

The interrupt source device may be permitted to raise a number of different types or categories of interrupts in various embodiments (e.g., with a respective interrupt number or identifier being associated with each category), and details about how different types of interrupts are to be raised may be stored in the combination of data structures depicted in FIG. 5. The MSI-X capability structure 591 may include a global mask 594 (which may be used to inhibit interrupts of all categories from the ISD 512), as well as respective pointers (such as respective offsets within the ISD memory) 592 and 593 to the MSI-X table 522 and the PBA 532. As shown in the expanded view 544, the MSI-X table may comprise a plurality of interrupt category configuration entries (ICCEs) 533, such as 533A and 533N in the depicted embodiment.

A given ICCE 533 may comprise several fields pertaining to a corresponding category of interrupts that can be raised by the ISD, including a vector control field 571 (e.g., 571A or 571N), a message data field 572 (e.g., 572A or 572N) and one or more memory address fields 573 (e.g., 573A or 573N). The vector control field 571 may be used as a category-specific mask—e.g., one value of the vector control field may be used to inhibit or disable interrupts of the category corresponding to the ICCE, while a different value may be used to enable or dis-inhibit such interrupts. Thus, it may feasible in the depicted embodiment to enable some categories of interrupts from a given ISD, while inhibiting or masking out other categories. The message data field 572 of an ICCE 533 may indicate a value which, if written to a memory address indicated by the address information field 573 (e.g., via an IRQ (interrupt request) processor 525, as indicated by arrow 511), has the effect of raising the interrupt of the category corresponding to that ICCE in the depicted embodiment. In at least some embodiments, during a time interval in which the vector control field 572A has a value that indicates that interrupts of the category represented by ICCE 533A are enabled, if the data indicated in field 572A is written to a memory location indicated in field 573A, an interrupt controller of the server may convert this write into a signal sent to the primary processors (CPUs) of the server, resulting in the invocation of an interrupt handler, with a certain vector comprising information about the specific interrupt that was raised being obtained the interrupt handler.

In some embodiments, an operating system at a server comprising the ISD (such as a guest operating system 545 in scenarios in which virtualization is being used) may be responsible for populating the contents of the MSI-X capability structure 591 and/or an MSI-X table 522, as indicated by arrow 510. For example, the guest operating system may update the global mask 594 and/or individual vector controls 571 when interrupts are to be inhibited/disabled or enabled in various embodiments. At least a portion of the MSI-X data structures may be written to in some embodiments during operations to re-configure interrupts after a period during which interrupts were inhibited, e.g., in operations similar to those indicated by arrow 213 of FIG. 2. In at least some embodiments, such writes may be performed with the help of a virtualization management component which comprises an interrupt recovery manager 540, and/or the IRM 540 may at least be able to access the MSI-X data structures for various interrupt source devices of the server.

In some embodiments, a virtualization management component, instead of or in addition to the guest operating system 545, may be responsible for managing the MSI-X capability structure and/or the MSI-X table associated with one or more ISDs.

In one embodiment, when an interrupt of a certain category is to be raised, e.g., by an interrupt request source 524 of the ISD, the IRQ source 524 may initially set a bit corresponding to that category within the PBA 532, indicating that the interrupt has not yet been raised. IRQ processor 525 may read the corresponding ICCE 533 in the MSI-X table; if the interrupt is not inhibited/masked (depending on the value of the vector control 571), a memory write 511 may be performed by the IRQ processor 525, eventually resulting in the invocation of the appropriate interrupt handler as indicated above. The PBA entry may be reset by the IRQ processor 525 in such an embodiment after the write 511 is performed, as the interrupt is no longer considered to be pending.

After a time interval in which interrupts were disabled ends, the IRM 540 may examine the MSI-X tables of one or more ISDs. To provide indications of possible missed interrupts from such devices, the IRM 540 may cause values (corresponding to the message data fields 572 of one or more ICCEs) to be written at addresses indicated in at least some of the ICCEs of the MSI-X table in various embodiments, in effect simulating interrupts by mimicking at least some of the operations that would have been performed by the IRQ processor in the event of an actual interrupt.

Example Provider Network Environment

Figure 6:
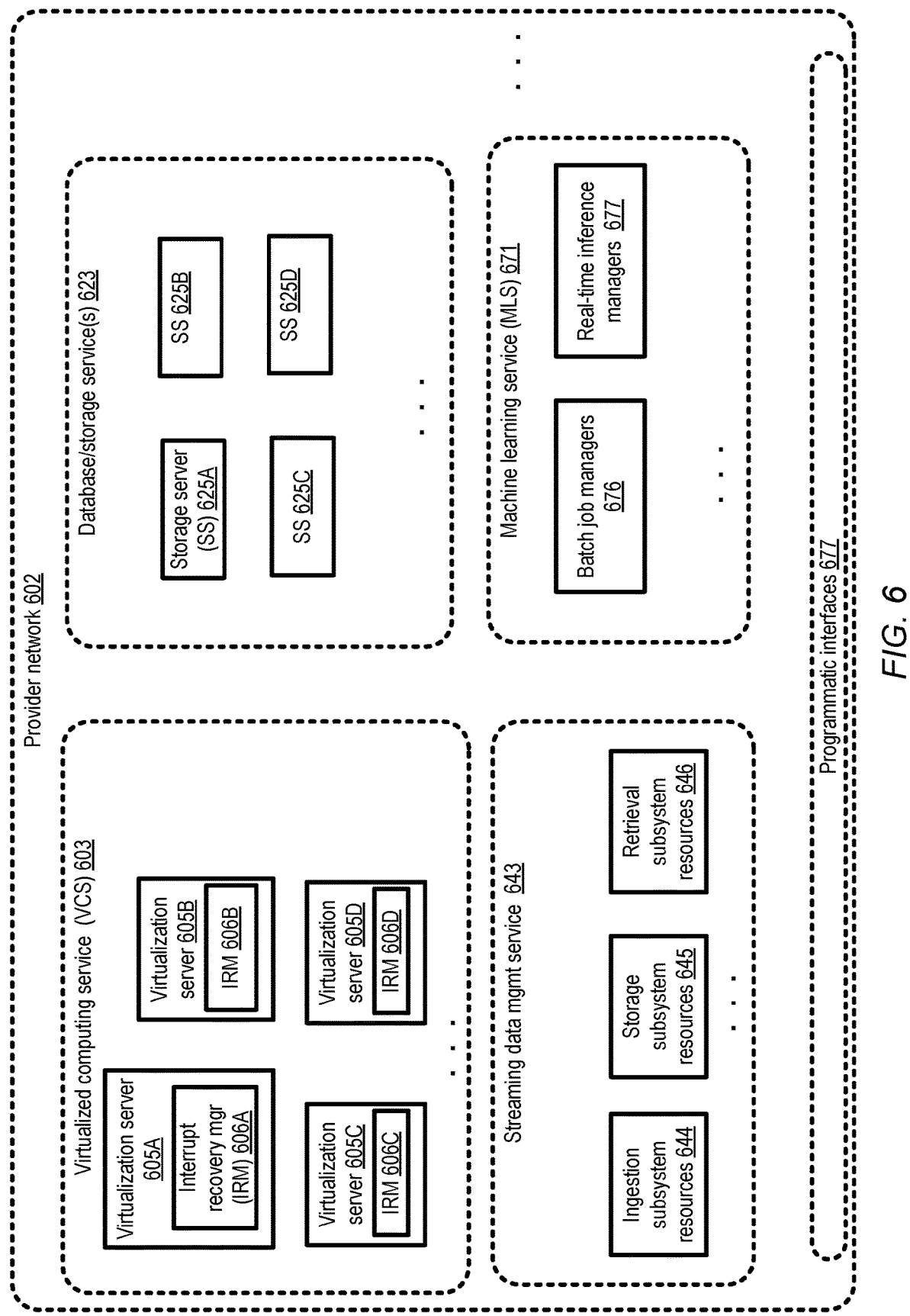
FIG. 6 illustrates an example provider network at which a virtualized computing service at which interrupt recovery managers are configured may be implemented, according to at least some embodiments.

FIG. 6 illustrates an example provider network at which a virtualized computing service at which interrupt recovery managers are configured may be implemented, according to at least some embodiments. As indicated earlier, networks set up by an entity such as a company or a public sector organization to provide one or more network-accessible services (such as various types of cloud-based computing, storage or analytics services) accessible via the Internet and/or other networks to a distributed set of clients may be termed provider networks in one or more embodiments.

The services implemented at provider network 602 in the depicted embodiment may include, for example, a virtualized computing service (VCS) 603, one or more database/storage service(s) 623, a streaming data service 643, and a machine learning service 671. Numerous other services may also be implemented at the provider in at least some embodiments. The VCS 603 may comprise a plurality of virtualization servers 605 (such as 605A-605B), similar in features and functionality of virtualization server 110 of FIG. 1, at which compute instances of various types may be instantiated for use by VCS clients in the depicted embodiment. At least some of the virtualization servers 605 may comprise respective interrupt recovery managers 606 (e.g., IRMs 606A-606D at servers 605A-605D respectively), which send indications of potential missed interrupts to the compute instances running at the servers using techniques similar to those discussed above.

Database/storage service 623 may comprise a plurality of storage servers 625 (e.g., 625A-625D), at which database instances of various types (relational, object-oriented, key-value-based, and so on) and/or other types of storage objects may be set up on behalf of clients in various embodiments. In at least one embodiment, a storage service 623 may comprise an object storage service that allows users to store unstructured data objects of arbitrary size, which can be retrieved using web services interfaces. In the depicted embodiment, a streaming data management service 643 may comprise respective sets of resources for ingesting/acquiring high volumes of data records (e.g., from a distributed set of sensors, from logs generated at large numbers of computing systems, etc.), storing such records and retrieving such records from storage for consumption by various analysis applications. These three types of tasks may be performed, for example, using resources 644 of an ingestion subsystem, resources 645 of a storage subsystem, and resources 646 of a retrieval subsystem respectively of the streaming data management service in some embodiments. Interrupts may be received at high rates at the ingestion subsystem in various embodiments, e.g., depending on the number of sensors or other data sources that generate streaming data. Machine learning service 671 may comprise batch job managers 676 for long-running tasks such as training of machine learning models, as well as real-time inference managers 677 for obtaining predictions from trained models in the depicted embodiment. In various embodiments, the input data to be consumed by one or more applications managed by the MLS 671 may be stored at or managed with the help of one or more of the database/storage services 623 and/or at streaming data service 643. Similarly, in at least one embodiment, the destinations to which results/output of tasks performed at the MLS are provided may include devices within the database/storage services 623. In one embodiment, one or more of the storage servers 625 and/or other computing devices used at services other than the VCS 603 may also include respective IRMs.

Individual ones of the services of provider network 602 may expose respective sets of programmatic interfaces 677 to its clients in the depicted embodiment. In general several of the services may utilize resources of other services (for example, the streaming data management service 643 may also utilize compute instances of the virtualized computing service 603 and storage devices provided by the database/storage services 623). As such, various services of provider network 602 may act as clients of other services, and may utilize the programmatic interfaces of the other services in the depicted embodiment. Such programmatic interfaces may also be used by clients of the provider network to submit interrupt configuration related requests in at least one embodiment, as discussed below in the context of FIG. 7. In some embodiments, at least some of the techniques discussed above for implementing interrupt recovery may be implemented at resources that are not part of network-accessible services such as those shown in FIG. 6.

Example Programmatic Interactions

Figure 7:
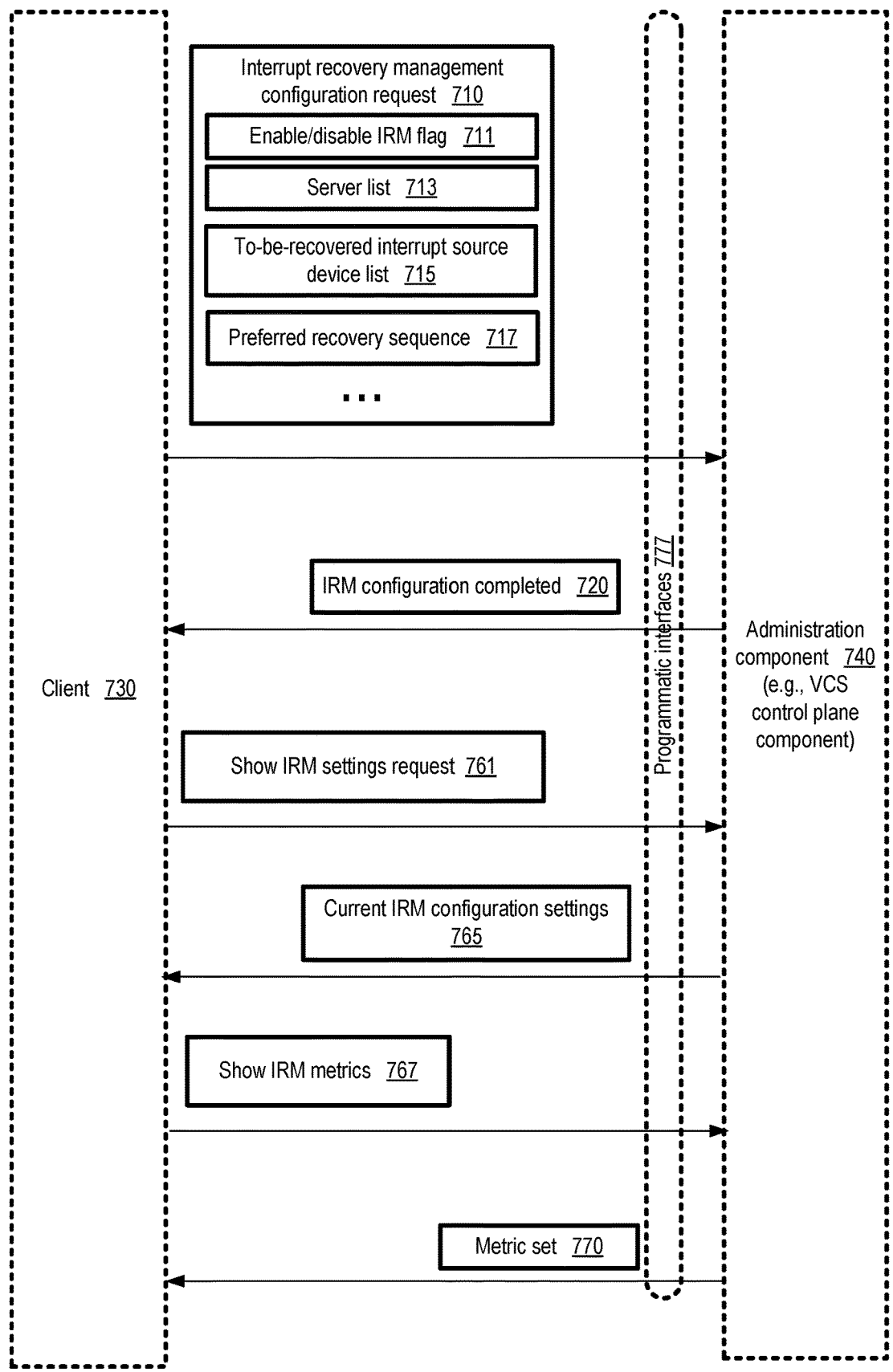
FIG. 7 illustrates example interrupt recovery configuration related programmatic interactions, according to at least some embodiments.

In some embodiments, as indicated earlier, clients of a service at which interrupt recovery techniques are implemented, or users of servers at which such techniques are implemented, may provide programmatic guidance regarding one or more aspects of interrupt recovery. FIG. 7 illustrates example interrupt recovery configuration related programmatic interactions, according to at least some embodiments. In the depicted embodiment, an administration component 740 (such as a control plane component of a virtualized computing service, or a process/daemon within an operating system or virtualization management component) may implement one or more programmatic interfaces 777 which may be employed by clients 730 to submit configuration related requests and receive corresponding responses. The programmatic interfaces 777 may include, for example, one or more web-based consoles, a set of application programming interfaces (APIs), command-line tools, graphical user interfaces and the like in different embodiments.

A client 730 may submit an interrupt recovery management configuration request 710 via programmatic interfaces 777 in the depicted embodiment. The request 710 may include an enable/disable IRM flag 711 in various embodiments, indicating whether the client wishes to have interrupt recovery management techniques of the kind discussed above enabled on one or more of the virtualization servers used on behalf of the client. In some embodiments, the client 730 may indicate a list of servers 713 at which interrupt recovery is to be performed. In one embodiment, a client may indicate a list 715 of interrupt source devices, at the specified servers, with respect to whose interrupts recovery management techniques are to be implemented. In one embodiment, instead of or in addition to indicating ISDs for which interrupt recovery is to be enabled, a client 730 may specify one or more ISDs for which interrupt recovery is not to be performed. In some embodiments, a client 720 may indicate specific categories of interrupts (e.g., corresponding to respective interrupt category configuration entries or ICCEs 533 shown in FIG. 5) for which interrupt recovery is to be enabled or disabled. In one embodiment, a preferred recovery sequence 717 field may be populated in request 710, indicating a preferred order in which recovery operations such as simulated interrupts are to be generated for different ISDs at individual servers. Other requested/preferred properties of interrupt recovery management may be indicated in a request 710 in some embodiments.

In response to the configuration request 710, in various embodiments the administration component 740 may store metadata indicating the client's requested preference, e.g., within a control plane repository of a virtualized computing service (VCS). A response message 720 indicating that IRM configuration has been completed may be transmitted in some embodiments. In at least one embodiment, a client 730 may submit a request 761 to view the IRM settings being used for the client, and a representation of the current IRM configuration settings 765 may be provided in response.

In some embodiments, the interrupt recovery managers and/or other components of the VCS or the servers at which the interrupt recovery techniques are performed may capture metrics pertaining to recovery of interrupts, e.g., how many simulated interrupts were generated during a given time period, and on behalf of which specific interrupt source devices such simulated interrupts were generated. A client 730 may request such metrics via a programmatic request 767 in some embodiments, and the administration component may provide a corresponding metric set 770 in response. Note that other types of programmatic interactions related to interrupt recovery management may be supported in some embodiments than the examples shown in FIG. 7, and in some embodiments, one or more of the types of programmatic interactions shown in FIG. 7 may not be supported.

Methods for Interrupt Recovery

Figure 8:
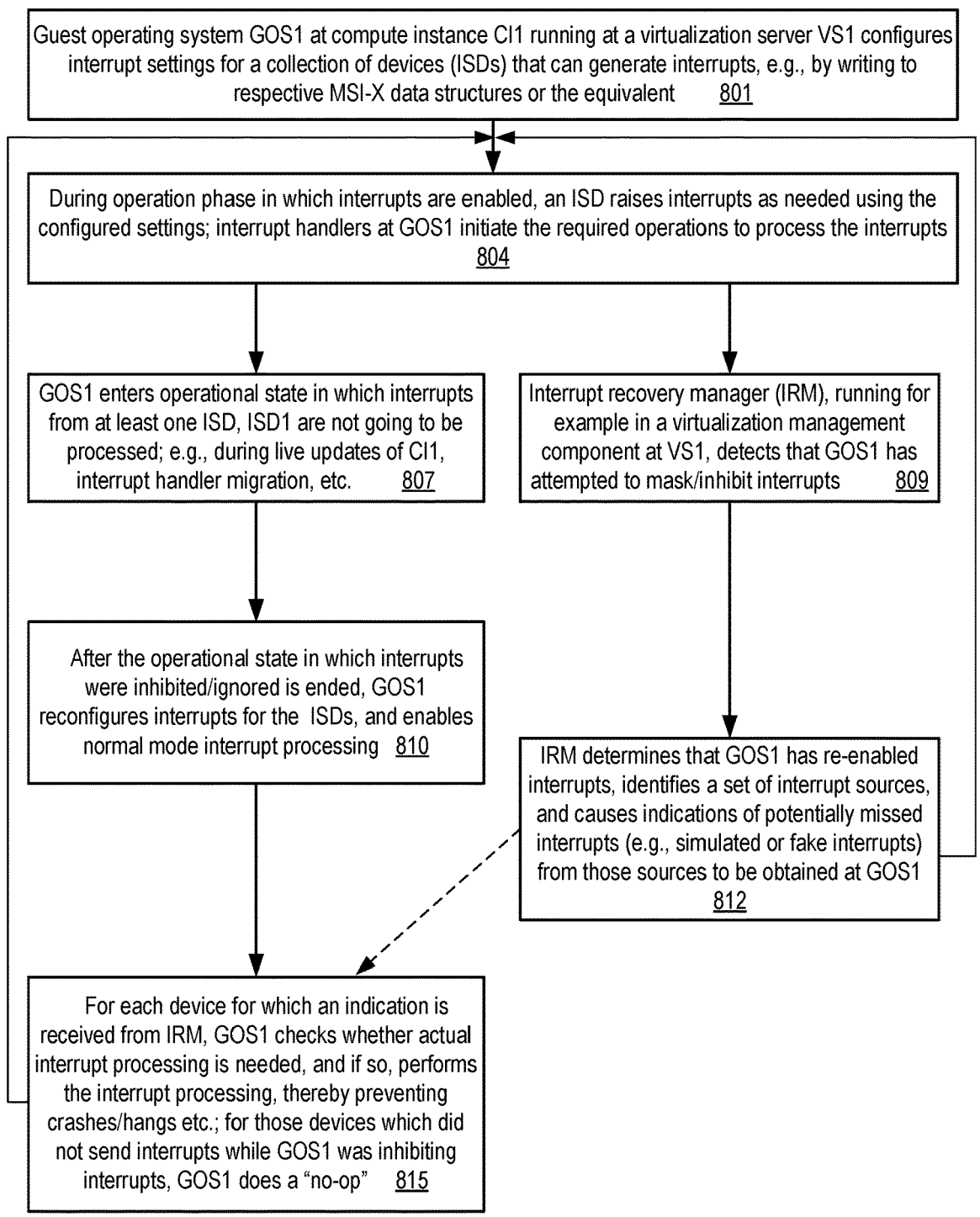
FIG. 8 is a flow diagram illustrating aspects of operations that may be performed to enable interrupt recovery at a server, according to at least some embodiments.

FIG. 8 is a flow diagram illustrating aspects of operations that may be performed to enable interrupt recovery at a server, according to at least some embodiments. As shown in element 801, a guest operating system GOS1 at a compute instance CD running at a virtualization server VS1 (e.g., part of a virtualized computing service of a provider network) may configure interrupt settings for a collection of devices that can generate interrupts in the depicted embodiment. The configuration settings may, for example, be written to a set of MSI (message signaling interrupt) data structures such as an MSI-X table, and MSI-X capability structure or the logical equivalent of such data structures in some implementations. Note that in some embodiments, other types of interrupt processing techniques which do not use MSIs may be employed.

During normal operating conditions, interrupts from most or all the different interrupt source devices (ISD) of the server may be permitted. During such phases of operation, an ISD may raise an interrupt, e.g., in accordance with the settings stored by the compute instance (element 804). An interrupt handler of GOS1 may initiate the required operations to process of manage an interrupt, e.g., operations to read/write data, to set/reset device state information, and so on.

Interrupts from one or more of the interrupt sources may be temporarily inhibited or disabled in various embodiments, e.g., in scenarios when software of the compute instances is being live-updated (updated without shutting down the compute instance), and/or during periods when interrupt handlers are being migrated from one CPU or primary processor to another for load balancing. As indicated in element 807, GOS1 may enter such an operational state in the depicted embodiment. Note that at least in some embodiments, other tasks may continue to be performed at CI1 during such operational states—that is, CI1 or GOS1 may not necessarily be swapped out or quiesced. After the tasks that required the disabling of interrupts are completed, GOS1 may reconfigure interrupts for the ISDs (element 810), and enable normal mode interrupt processing in various embodiments.

An interrupt recovery manager (IRM), implemented for example as one or more threads of execution at server VS1, may be able to detect when GOS1 enters and exits such states in which interrupts are inhibited and then re-enabled in at least some embodiments. As indicated in element 809, the IRM may detect when GOS1 attempts to mask off interrupts in operations corresponding to element 807. When the IRM determine that GOS1 has re-enabled interrupts (element 812), the IRM may identify a set of one or more interrupt source devices, and cause indications of potentially missed interrupts from those sources to be obtained at GOS1 in various embodiments. Note that the IRM may not record, or have any indication of, any actual missed interrupts in some embodiments; the indications of missed interrupts may be generated as a precaution, in case any interrupts happened to be missed, and not because the IRM has evidence that one or more interrupts were missed. In some embodiments, the IRM may determine a subset of ISDs for which respective indications of potential missed interrupts are to be provided, e.g., based on guidance obtained programmatically from a client as discussed in the context of FIG. 7. In at least one embodiment, indications of potential missed interrupts may be generated for all the ISDs of a particular category (e.g., ISDs that implement PCIe standards regarding interrupts), or for all ISDs present in the server. In various embodiments, data structures indicating interrupt source devices configured for one or more compute instances may be maintained, e.g., within a virtualization management component, and such data structures may be read by the IRM to identify at least some of the ISDs to which the indications of potential missed interrupts are to be provided. In some embodiments, at least a portion of the IRM functionality may be implemented within GOS1 itself, and/or within some or all of the ISDs; that is, not all the functionality of an IRM may necessarily be performed at a virtualization management component such as a hypervisor.

For individual ones of the ISDs for which a respective indication of a potential missed interrupt is received (element 815), GOS1 may check whether actual interrupt processing is needed in the depicted embodiment—e.g., whether an interrupt was actually missed. For example, one or more data structures into which the ISD would have written data to indicate an actual interrupt may be checked, state information of the ISD may be examined, and so on in different embodiments. If GOS1 determines that interrupt-related processing is to be performed with respect to a given ISD, the needed operations may be initiated in various embodiments. For those devices which did not send interrupts while GOS1 was inhibiting interrupts, GOS1 may perform the equivalent of a no-op (no operation), i.e., additional interrupt-related processing may not be performed. Operations corresponding to elements 804 onwards may be repeated, e.g., for each state of normal operation (states in which interrupts are not inhibited/disabled) followed by a state of interrupt inhibition.

It is noted that in various embodiments, at least some operations other than those illustrated in the flow diagrams of FIG. 8 may be used to implement the isolation management techniques described above. Some of the operations shown may not be implemented in some embodiments or may be implemented in a different order, or in parallel rather than sequentially.

Use Cases

The techniques described above, of generating indications of potential missed interrupts after interrupts are re-enabled following a temporary state of interrupt inhibition or disablement, may be useful in a variety of scenarios. Tasks that may require interrupts from one or more sources to be inhibited, such as live updates, live migrations, load balancing of interrupt handlers and the like, are performed more and more frequently at virtualized computing services, especially in environments where a single server may be used for large numbers of compute instances. If interrupts are missed at a compute instance, for example as a result of a race condition between an interrupt-masking operation and the generation of an interrupt at an interrupt source, in many cases hard-to-debug and hard-to-reproduce events may occur. The compute instances may for example hang or crash, application data may be lost, devices may be reset unexpectedly, and so on. By causing the instances to check, as a result of simulated interrupts generated by an interrupt manager after interrupts are re-enabled, whether interrupt-related processing is needed for various devices, and by performing such processing in those cases when it is needed, such problematic scenarios may be avoided with a very low overhead.

Illustrative Computer System

Figure 9:
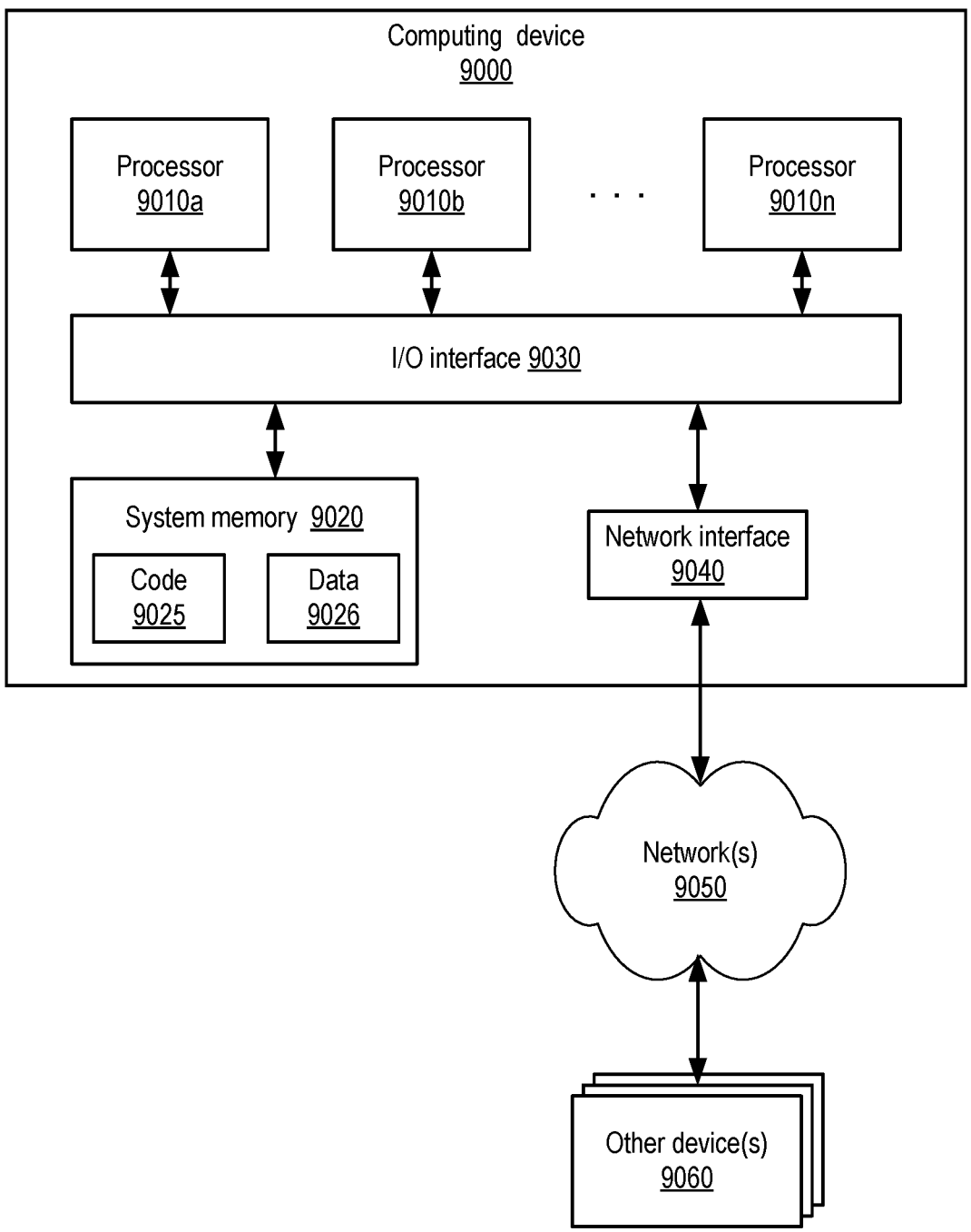
FIG. 9 is a block diagram illustrating an example computing device that may be used in at least some embodiments.

In at least some embodiments, a server that implements a portion or all of one or more of the technologies described herein, including interrupt recovery managers, virtualization management components, administrative as well as data plane components of various network-accessible services such as a virtualized computing service and the like may include a general-purpose computer system that includes or is configured to access one or more computer-accessible media. FIG. 9 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030. In at least some embodiments computing device 9000 may include a motherboard to which some or all of such components may be attached.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 8, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol. Network interface 9040 and/or other I/O devices may represent examples of the kinds of interrupt sources for which recovery techniques described earlier may be implemented in at least some embodiments.

In some embodiments, system memory 9020 may be one embodiment of a computer-accessible medium configured to store program instructions and data as described above for FIG. 1 through FIG. 8 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A method, comprising:
    performing, at one or more computing devices;
        entering, by a compute instance running at a virtualization server, a state in which interrupts from at least one interrupt source are not processed at the compute instance;
        in response to detecting, by an interrupt recovery manager, that the compute instance has exited the state:
            identifying, by the interrupt recovery manager, one or more interrupt sources for which respective indications of potential missed interrupts are to be provided to the compute instance, wherein the one or more interrupt sources include a first interrupt source, wherein the potential missed interrupts are generated to indicate a possibility that interrupts were initiated at the one or more interrupt sources but not processed at the compute instance while the compute instance was in the state; and
            causing, by the interrupt recovery manager, an indication of a first potential missed interrupt of the first interrupt source to be delivered to the compute instance; and
        determining, by the compute instance in response to the indication of the first potential missed interrupt, that the first interrupt source raised a first interrupt while the compute instance was in the state; and performing, by the compute instance, one or more operations responsive to the first interrupt.

2. The method as recited in claim 1, further comprising performing, at the one or more compute devices:

storing, by the compute instance, a value indicating that interrupts from the first interrupt source are not going to be processed at the compute instance, wherein the first interrupt is raised by the first interrupt source (a) after the storing of the value is initiated and (b) before the value is accessed at the first interrupt source.

3. The method as recited in claim 1, wherein the interrupt recovery manager is incorporated within a virtualization management component of the virtualization server.

4. The method as recited in claim 3, wherein the virtualization management component comprises a thread of execution running on a primary physical processor of the virtualization server.

5. The method as recited in claim 3, wherein the virtualization management component comprises a thread of execution running on an offload card of the virtualization server.

6. The method as recited in claim 1, wherein in the state, an update of at least a portion of software of the compute instance is performed.

7. The method as recited in claim 1, wherein in the state, an interrupt handler of the compute instance is migrated from a first processor of the virtualization server to another processor.

8. The method as recited in claim 1, further comprising performing, at the one or more computing devices:

obtaining, at the compute instance, an indication of a second potential missed interrupt of a second interrupt source;

determining, at the compute instance, that (a) an interrupt from the second interrupt source was not generated while the compute instance was in the state; and (b) further interrupt processing associated with the second interrupt source is not to be performed.

9. The method as recited in claim 1, wherein the first interrupt source comprises one or more of: (a) a network device, (b) a storage device, (c) a peripheral device or (d) a graphics processing unit (GPU).

10. The method as recited in claim 1, wherein the first interrupt is a message signaled interrupt.

11. The method as recited in claim 1, further comprising performing, at the one or more computing devices:

storing, by the compute instance, in a location accessible to the first interrupt source, (a) a first memory address and (b) a value to be stored in the first memory address to trigger an interrupt of a particular category from the first interrupt source.

12. A system, comprising:
one or more processors, and
a memory comprising program instructions that when executed on the one or more processors cause the one or more processors to:
detect, by an interrupt recovery manager, that a compute instance running at a virtualization server has exited a state in which interrupts from at least one interrupt source were not processed at the compute instance,
cause, by the interrupt recovery manager, an indication of a first potential missed interrupt of a first interrupt source to be obtained at the compute instance, wherein the indication indicates a possibility that an interrupt was initiated at the first interrupt source but not processed at the compute instance while the compute instance was in the state; and
determine, by the compute instance in response to the indication of the first potential missed interrupt, that the first interrupt source raised a first interrupt while the compute instance was in the state; and
perform, by the compute instance, one or more operations responsive to the first interrupt.

13. The system as recited in claim 12, wherein the first interrupt is a message signaled interrupt (MSI).

14. The system as recited in claim 12, wherein the interrupt recovery manager comprises a thread of execution of a virtualization management component.

15. The system as recited in claim 12, wherein the interrupt recovery manager comprises a thread of execution of the compute instance.

16. The system as recited in claim 12, wherein the memory comprises further program instructions that when executed on the one or more processors further cause the one or more processors to:

in response to an indication of a second potential missed interrupt associated with a second interrupt source, determine, by the compute instance, that (a) the second interrupt source did not raise an interrupt and (b) no additional operations associated with the second potential missed interrupt are to be performed.

17. The system as recited in claim 12, wherein the memory comprises further program instructions that when executed on the one or more processors further cause the one or more processors to:

determine, based at least in part on input received via a programmatic interface, that (a) indications of potential missed interrupts associated with the first interrupt source are to be provided and (b) indications of potential missed interrupts associated with a second interrupt source are not to be provided.

18. One or more non-transitory computer-accessible storage media storing program instructions that, when executed by one or more processors, cause the one or more processors to perform operations comprising:

detecting that a compute instance has exited a state in which interrupts from at least one interrupt source were not processed at the compute instance, identifying at least a first interrupt source from which interrupts may have been initiated at the first interrupt source but missed at the compute instance while the compute instance was in the state;

causing an indication of a first potential missed interrupt of the first interrupt source to be delivered to the compute instance;

determine, by the compute instance in response to the indication of the first potential missed interrupt, that the first interrupt source raised a first interrupt while the compute instance was in the state; and perform, by the compute instance, one or more operations responsive to the first interrupt.

19. The one or more non-transitory computer-accessible storage media system as recited in claim 18, the operations further comprising:

storing a value at a location indicated in a message signaled interrupt (MSI) or MSI-extended (MSI-X) data structure to cause the indication of the first potential missed interrupt to be delivered.

20. The one or more non-transitory computer-accessible storage media system as recited in claim 18, the operations further comprising:

determining, based at least in part on input received via a programmatic interface, that (a) indications of potential missed interrupts associated with the first interrupt source are to be delivered, and (b) indications of potential missed interrupts associated with a second interrupt source are not to be delivered.

21. The one or more non-transitory computer-accessible storage media system as recited in claim 18, wherein the first interrupt source comprises one or more of: (a) a network device, (b) a storage device, (c) a peripheral device or (d) a graphics processing unit (GPU).

22. The one or more non-transitory computer-accessible storage media system as recited in claim 18, the operations further comprising:

examining contents of one or more mask data structures which were updated by the compute instance to determine that the compute instance has exited the state.

\* \* \* \* \*